United States Patent
Park et al.

(10) Patent No.: US 7,123,489 B2
(45) Date of Patent: Oct. 17, 2006

(54) VARIABLE-FREQUENCY FLYBACK CONVERTER WITH SYNCHRONOUS RECTIFICATION FUNCTION

(75) Inventors: Tae Ook Park, Kyungki-do (KR); Sung Cheol Kim, Kyungki-do (KR); Chan Gyu Jang, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 171 days.

(21) Appl. No.: 10/911,558

(22) Filed: Aug. 5, 2004

(65) Prior Publication Data

US 2005/0276079 A1     Dec. 15, 2005

(30) Foreign Application Priority Data

Jun. 14, 2004     (KR)     ...................... 10-2004-0043544

(51) Int. Cl.
*H02M 3/335*     (2006.01)
(52) U.S. Cl. .................................... 363/21.14
(58) Field of Classification Search ............ 363/21.06, 363/21.14, 89, 127
See application file for complete search history.

(56) References Cited

U.S. PATENT DOCUMENTS

| | | | | |
|---|---|---|---|---|
| 5,774,350 A | * | 6/1998 | Notaro et al. .................. | 363/89 |
| 6,430,071 B1 | * | 8/2002 | Haneda ....................... | 363/127 |
| 6,442,048 B1 | | 8/2002 | Sun et al. .................. | 363/21.14 |
| 6,529,390 B1 | * | 3/2003 | Takahashi ................. | 363/21.14 |
| 6,674,658 B1 | * | 1/2004 | Mao et al. .................... | 363/127 |
| 6,791,849 B1 | * | 9/2004 | Nakayama ............... | 363/21.14 |
| 6,839,248 B1 | * | 1/2005 | Yang ........................ | 363/21.12 |
| 6,856,149 B1 | * | 2/2005 | Yang .......................... | 324/726 |
| 7,012,821 B1 | * | 3/2006 | Park et al. ................ | 363/21.12 |
| 7,042,739 B1 | * | 5/2006 | Nagai et al. ............. | 363/21.06 |

\* cited by examiner

*Primary Examiner*—Jeffrey Sterrett
(74) *Attorney, Agent, or Firm*—Lowe, Hauptman & Berner, LLP.

(57) ABSTRACT

Disclosed herein is a variable-frequency flyback. The flyback converter comprises a flyback transformer having secondary windings for drive and detection for providing first and second induced voltages induced from an input voltage in first and second turn ratios with a primary winding, respectively, a voltage detector for detecting the second induced voltage, a switching controller for determining, on the basis of a level of the voltage detected by the voltage detector, whether a current load state is the mini load state and outputting a first switching signal according to a result of the determination, a first switch for switching the supply of the second induced voltage in response to the second induced voltage and the first switching signal, and a synchronous rectifier for performing a switching operation depending on a state of the first switch, the synchronous rectifier having its source and drain connected to any one of a voltage output line or ground line connected to the drive secondary winding and its gate connected to the first switch.

8 Claims, 7 Drawing Sheets

PRIOR ART

Upon generation of backward current,
SR is turned off to prevent large backward
current from being generated Large backward current generated

VARIABLE-FREQUENCY FLYBACK CONVERTER WITH SYNCHRONOUS RECTIFICATION FUNCTION

RELATED APPLICATIONS

The present application is based on, and claims priority from, Korean Application Number 2004-43544, filed Jun. 14, 2004, the disclosure of which is hereby incorporated by reference herein in its entirety.

BACKGROUND OF THE INVENTION

1. Field of the Invention

The present invention relates to a flyback converter for a power supply device, such as a switching mode power supply (SMPS), and more particularly to a variable-frequency flyback converter with a synchronous rectification function which is capable of detecting a secondary voltage of a transformer to determine whether the current load state is a mini load state with a predetermined load or less and preventing backward current from being generated in the mini load state, so as to reduce power consumption in the minim load state, including a no-load state.

2. Description of the Related Art

As well known to those skilled in the art, power supplies are modular power supply devices that convert an external supply voltage into voltages appropriate to various electric appliances such as a computer, a color television (TV), a video cassette recorder (VCR), an exchange and a wireless communication terminal, and act to cut off high frequencies above a commercial frequency using semiconductor switching characteristics to remove damage resulting therefrom.

Such power supplies can be roughly classified into linear power supplies and SMPSs. The SMPSs are more advantageous for miniaturization and higher in efficiency than the linear power supplies so that they can be more appropriate to lightness/smallness of associated electronic products. In this regard, the SMPSs have taken their place as main power supply devices of electronic products since the beginning of the 1990's.

The SMPSs can be variously classified according to the types of circuits and the types of input and output voltage sources. The newest technical one of the circuit types is a resonant type. The most often used ones of the voltage sources are an alternating current/direct current (AC/DC) converter that converts an AC supply voltage of 110V or 220V into a DC voltage of 5 to 48V, and a DC/DC converter that reconverts that DC voltage into a DC voltage of 3.3 to 48V.

These SMPSs are advantageous for lightness and smallness, but have the problem of having to attenuate switching noise and electromagnetic waves occurring in a switching transistor, etc.

Meanwhile, as one of flyback converters for the SMPSs, a variable-frequency flyback converter is used in which a switching frequency for zero-crossing switching varies with a load state. This variable-frequency flyback converter is adapted to detect zero-crossings of secondary current of a flyback transformer and control switching timing of a main switch connected to a primary winding of the transformer in accordance with a result of the detection. The switching frequency of this flyback converter varies with the load state.

That is, if the load is large, the secondary current is large, too. As a result, the zero-crossing time is lengthened, thereby causing the switching frequency to be lowered. On the contrary, if the load is small, the secondary current is small, too. As a result, the zero-crossing time is shortened, so the switching frequency is raised.

However, in a mini load state where the load is minimal, the switching frequency is raised, causing an increase in switching noise. For this reason, in the mini load state, the upper-limit value of the switching frequency is set to a predetermined value, for example, 150 kHz, in order to suppress the increase of the switching noise to a certain degree.

Here, a distinction may be made between the normal load and the mini load on the premise that a load in a standby mode is defined as the mini load. In this case, a load of 3 W or less, including no load, can be defined as the mini load.

Notably, in the mini load state, a discontinuous conducting mode (DCM) period in which no primary current and secondary current flow exists because the upper-limit switching frequency value is set. In the DCM period, a valley is generated due to a resonance by parasitic capacitors of the primary winding and main switch after a voltage across the main switch is transferred to a secondary winding of the flyback transformer. This valley includes a high voltage causing backward current, so there is a need for a scheme to prevent the backward current.

Figure 1:
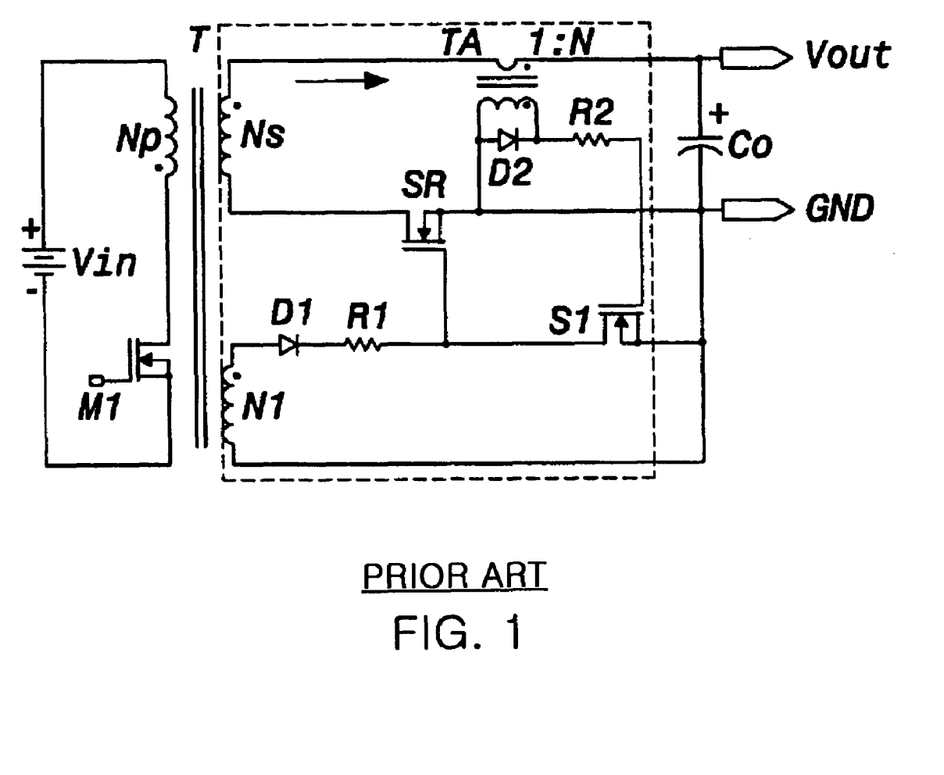
FIG. 1 is a circuit diagram of a conventional flyback converter.

Such a conventional flyback converter for an SMPS is shown in FIG. 1.

FIG. 1 is a circuit diagram of a conventional flyback converter.

In FIG. 1, if the gate of a thyristor M1 is turned on, an input voltage is stored in a primary winding of a transformer T. Thereafter, if the gate of the thyristor M1 is turned off, a positive voltage is applied to a negative electrode of an auxiliary secondary winding N1 of the transformer T. This positive voltage is in turn applied to a MOS (Metal-Oxide Semiconductor) transistor SR through a diode D1 and resistor R1 to turn it on. As a result, a positive voltage is applied to a negative electrode of a main secondary winding NS of the transformer T to provide an output voltage Vout.

At this time, a current transformer TA detects backward current and, when the backward current is detected, a positive voltage is applied to a negative electrode of a secondary winding of the current transformer TA. This positive voltage is in turn applied to a controllable unit S1 through a resistor R2 to turn it on. As a result, the MOS transistor SR is turned off to block the backward current.

However, the above-mentioned conventional flyback converter can somewhat reduce power consumption because the MOS transistor SR is turned off when the gate of the thyristor M1 is turned on, but has a disadvantage in that the MOS transistor SR still has considerable power consumption in a no-load state.

SUMMARY OF THE INVENTION

Therefore, the present invention has been made in view of the above problems, and it is an object of the present invention to provide a variable-frequency flyback converter with a synchronous rectification function which is capable of detecting a secondary voltage of a transformer to determine whether the current load state is a mini load state with a predetermined load or less and preventing backward current from being generated in the mini load state, so as to reduce power consumption in the minim load state, including a no-load state.

In accordance with the present invention, the above and other objects can be accomplished by the provision of a variable-frequency flyback converter with a synchronous rectification function, comprising: a flyback transformer having a primary winding connected to an input voltage, a secondary winding for drive for providing a first induced voltage induced from the input voltage in a first turn ratio with the primary winding, and a secondary winding for detection for providing a second induced voltage induced from the input voltage in a second turn ratio with the primary winding; a voltage detector for detecting the second induced voltage; switching control means for determining, on the basis of a level of the voltage detected by the voltage detector, whether a current load state is a mini load state with a predetermined load or less and outputting a first switching signal according to a result of the determination; a first switch for switching the supply of the second induced voltage in response to the second induced voltage and the first switching signal from the switching control means; and a synchronous rectifier for performing a switching operation depending on a state of the first switch, the synchronous rectifier having its source and drain connected to any one of a voltage output line or ground line connected to the drive secondary winding and its gate connected to the first switch.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings.

First, a description will be given of a variable-frequency flyback converter according to a first embodiment of the present invention with reference to FIGS. 2 to 8.

Figure 2:
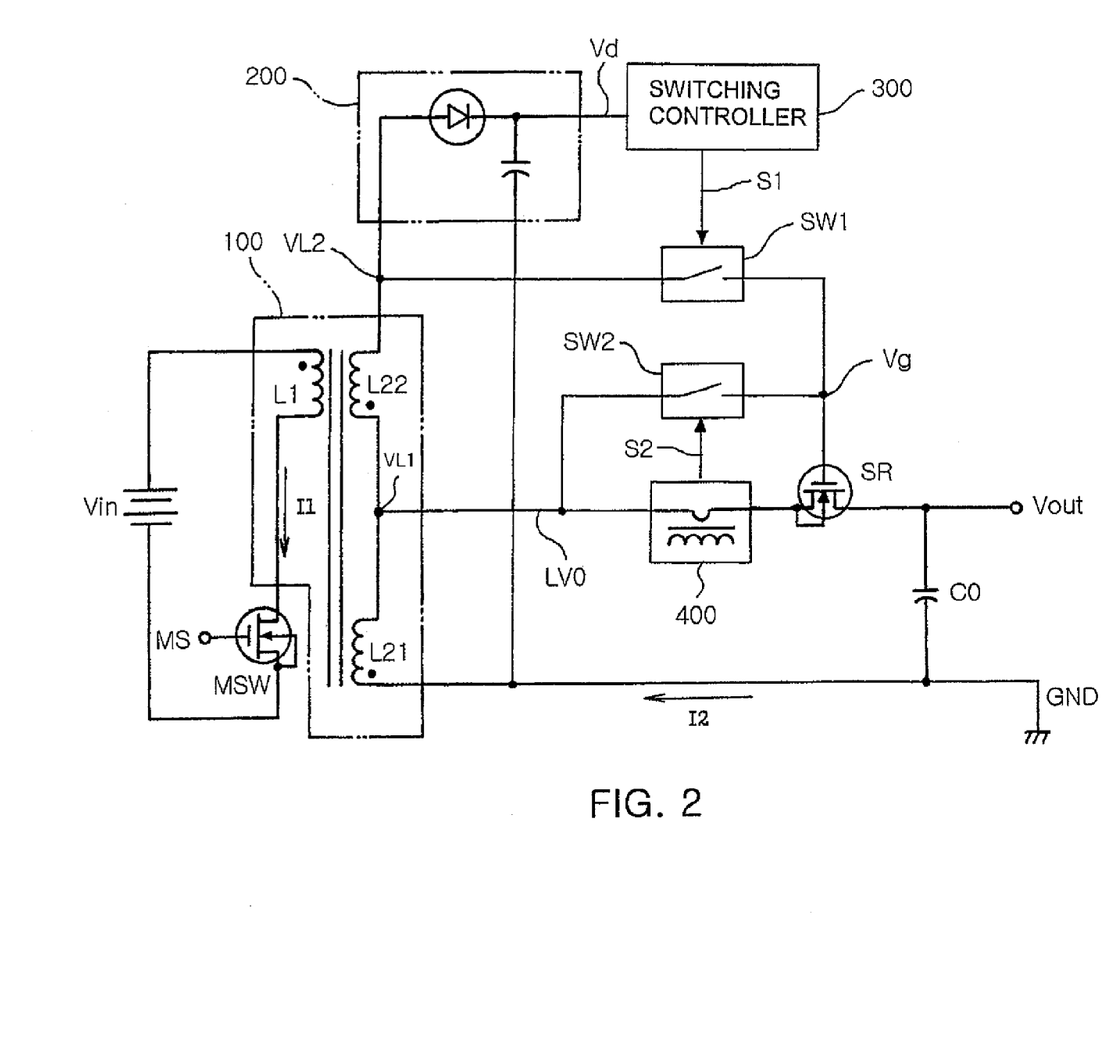
FIG. 2 is a circuit diagram of a variable-frequency flyback converter according to a first embodiment of the present invention.

FIG. 2 is a circuit diagram of the flyback converter according to the first embodiment of the present invention. As shown in this drawing, the flyback converter according to the first embodiment of the present invention comprises a flyback transformer 100, a voltage detector 200, a switching controller 300, a first switch SW1, a synchronous rectifier SR, a current detector 400 and a second switch SW2.

The flyback transformer 100 has a primary winding L1 connected to an input voltage Vin, a secondary winding L21 for drive for providing a first induced voltage VL1 induced from the input voltage Vin in a first turn ratio with the primary winding L1, and a secondary winding L22 for detection for providing a second induced voltage VL2 induced from the input voltage Vin in a second turn ratio with the primary winding L1.

Figure 3:
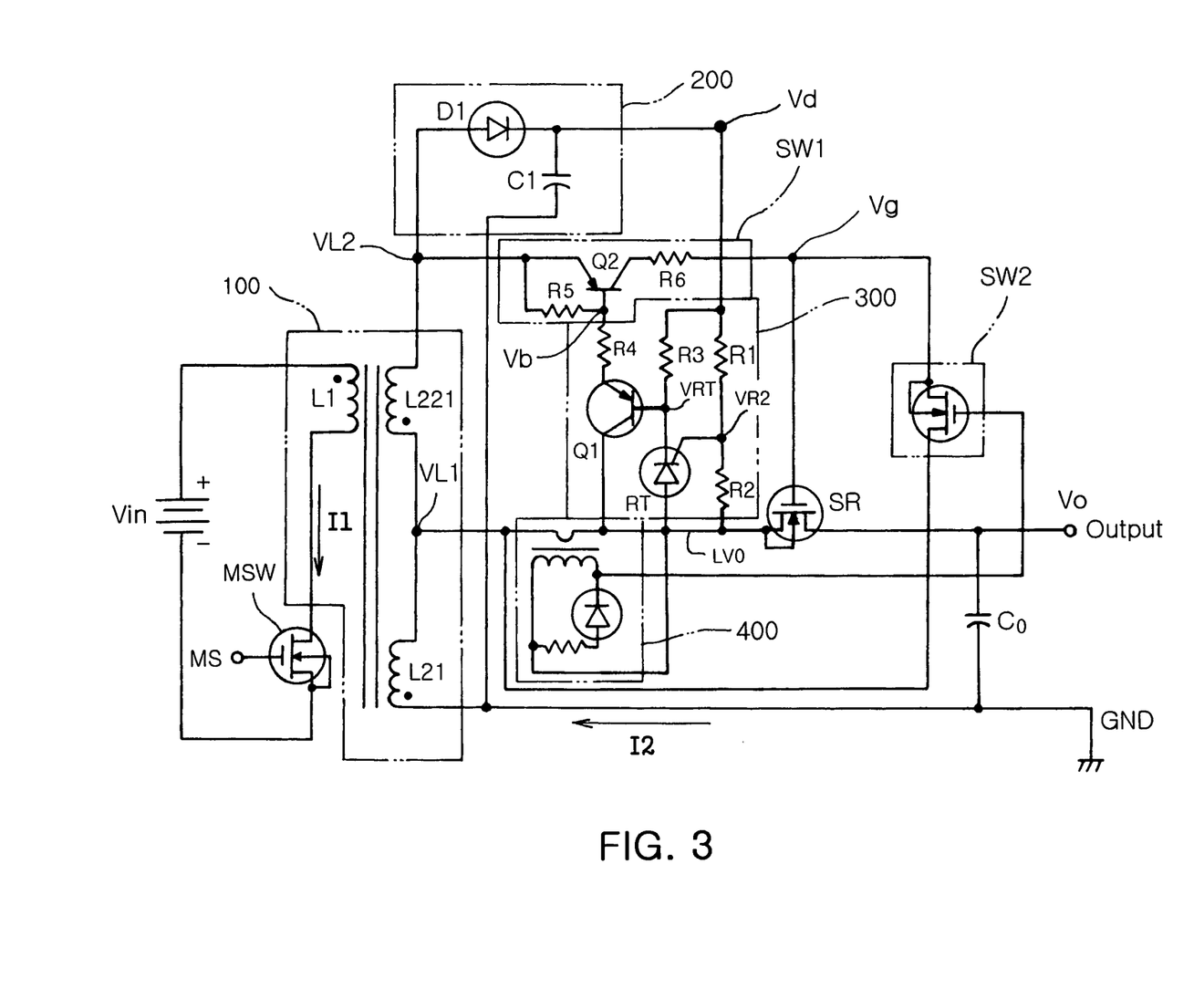
FIG. 3 is a detailed circuit diagram of the flyback converter of FIG. 2.

The voltage detector 200 acts to detect the second induced voltage VL2. To this end, the voltage detector 200 includes, as shown in FIG. 3, a rectifying diode D1 connected to the detection secondary winding L22, and a smoothing capacitor C1 for smoothing a voltage rectified by the rectifying diode D1.

The switching controller 300 acts to determine, on the basis of the level of the voltage detected by the voltage detector 200, whether the current load state is a mini load state with a predetermined load or less and output a first switching signal S1 according to a result of the determination. Here, in a normal load state, the switching controller 300 outputs the first switching signal S1 to the first switch SW1 to turn it on. On the contrary, in the mini load state, the switching controller 300 outputs the first switching signal S1 to the first switch SW1 to turn it off.

The first switch SW1 acts to switch the supply of the second induced voltage VL2 in response to the second induced voltage VL2 and the first switching signal S1 from the switching controller 300.

The synchronous rectifier SR acts to perform a switching operation depending on the state of the first switch SW1. To this end, the synchronous rectifier SR is provided with a MOS transistor having its source and drain connected to a voltage output line LVO connected to the drive secondary winding L21 and its gate connected to the first switch SW1.

The current detector 400 acts to detect backward current flowing between the drive secondary winding L21 and the synchronous rectifier SR and output a second switching signal S2 according to a result of the detection.

The second switch SW2 is connected between the voltage output line LVO connected to the drive secondary winding L21 and the gate of the synchronous rectifier SR and is turned on/off in response to the second switching signal S2 from the current detector 400.

FIG. 3 is a detailed circuit diagram of the flyback converter of FIG. 2. The circuit configuration of the switching controller 300 will hereinafter be described in detail with reference to FIG. 3.

In FIG. 3, the primary winding L1 of the flyback transformer 100 has its one end connected to a positive pole of the input voltage Vin and its other end connected to a negative pole of the input voltage Vin via a main switch MSW. The drive secondary winding L21 has its one end connected to a ground terminal GND and its other end connected to the voltage output line LVO and acts to provide the first induced voltage VL1 induced from the input voltage Vin in the first turn ratio with the primary winding L1. The detection secondary winding L22 has its one end connected to the other end of the drive secondary winding L21 and its other end connected to the voltage detector 200 and acts to provide the second induced voltage VL2 induced from the input voltage Vin in the second turn ratio with the primary winding L1.

With reference to FIG. 3, the switching controller 300 includes a shunt regulator RT for comparing an input voltage VR2 resulting from a voltage Vd detected by the voltage detector 200 with a predetermined reference voltage Vref and turning itself off if the input voltage VR2 is lower than the reference voltage Vref, and a first transistor Q1, as the shunt regulator RT is turned off, turned off for turning off the first switch SW1.

The first transistor Q1 is an N-type transistor having its base connected to an output terminal of the voltage detector 200 via a resistor R3, its emitter connected to the first switch SW1 via a resistor R4 and its collector connected to the voltage output line LVO.

The input voltage VR2 to the shunt regulator RT is a voltage across one R2 of two resistors R1 and R2 under the condition that the voltage Vd detected by the voltage detector 200 is divided by the two resistors R1 and R2. Here, the input voltage VR2 across the resistor R2 is lower than the reference voltage Vref in the mini load state and higher than or equal to the reference voltage Vref in the normal load state.

The first switch SW1 is provided with an N-type transistor Q2 having its emitter connected to the other end of the detection secondary winding L22, its collector connected to the gate of the synchronous rectifier SR via a resistor R6 and its base connected to the other end of the detection secondary winding L22 via a resistor R5 and to the emitter of the N-type transistor Q1 of the switching controller 300 via the resistor R4.

The second switch SW2 is provided with a MOS transistor having its source connected to the gate of the synchronous rectifier SR, its drain connected to the voltage output line LVO and its gate connected to the current detector 400.

Figure 4:
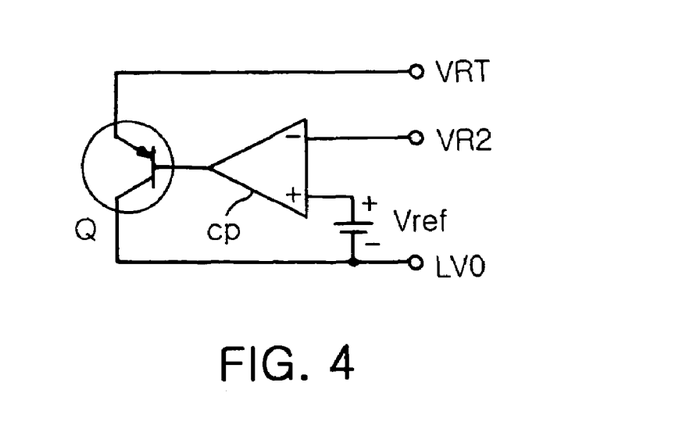
FIG. 4 is an equivalent circuit diagram of a shunt regulator of the present invention.

FIG. 4 is an equivalent circuit diagram of the shunt regulator RT of the present invention. As shown in this drawing, the shunt regulator RT includes a comparator CP having its non-inverting input terminal connected to the reference voltage Vref and its inverting input terminal connected to the input voltage VR2, and an N-type transistor Q for performing a switching operation in response to an output signal from the comparator CP.

Figure 5:
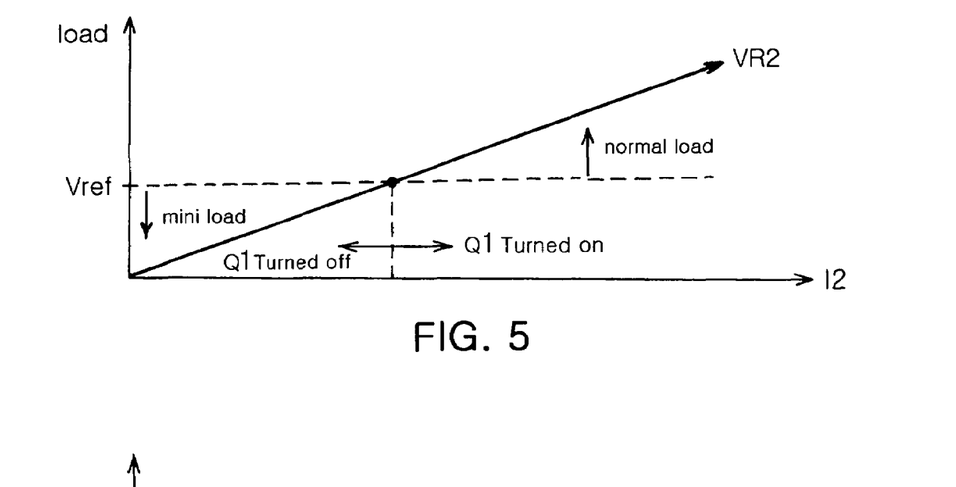
FIG. 5 is a graph illustrating operation characteristics of a switching controller based on the shunt regulator of the present invention.

FIG. 5 is a graph illustrating operation characteristics of the switching controller 300 based on the shunt regulator RT of the present invention. As shown in this drawing, in the normal load state, the input voltage VR2 is higher than or equal to the reference voltage Vref and the N-type transistor Q1 is thus turned on. On the contrary, in the mini load state, the input voltage VR2 is lower than the reference voltage Vref and the N-type transistor Q1 is thus turned off.

Figure 6:
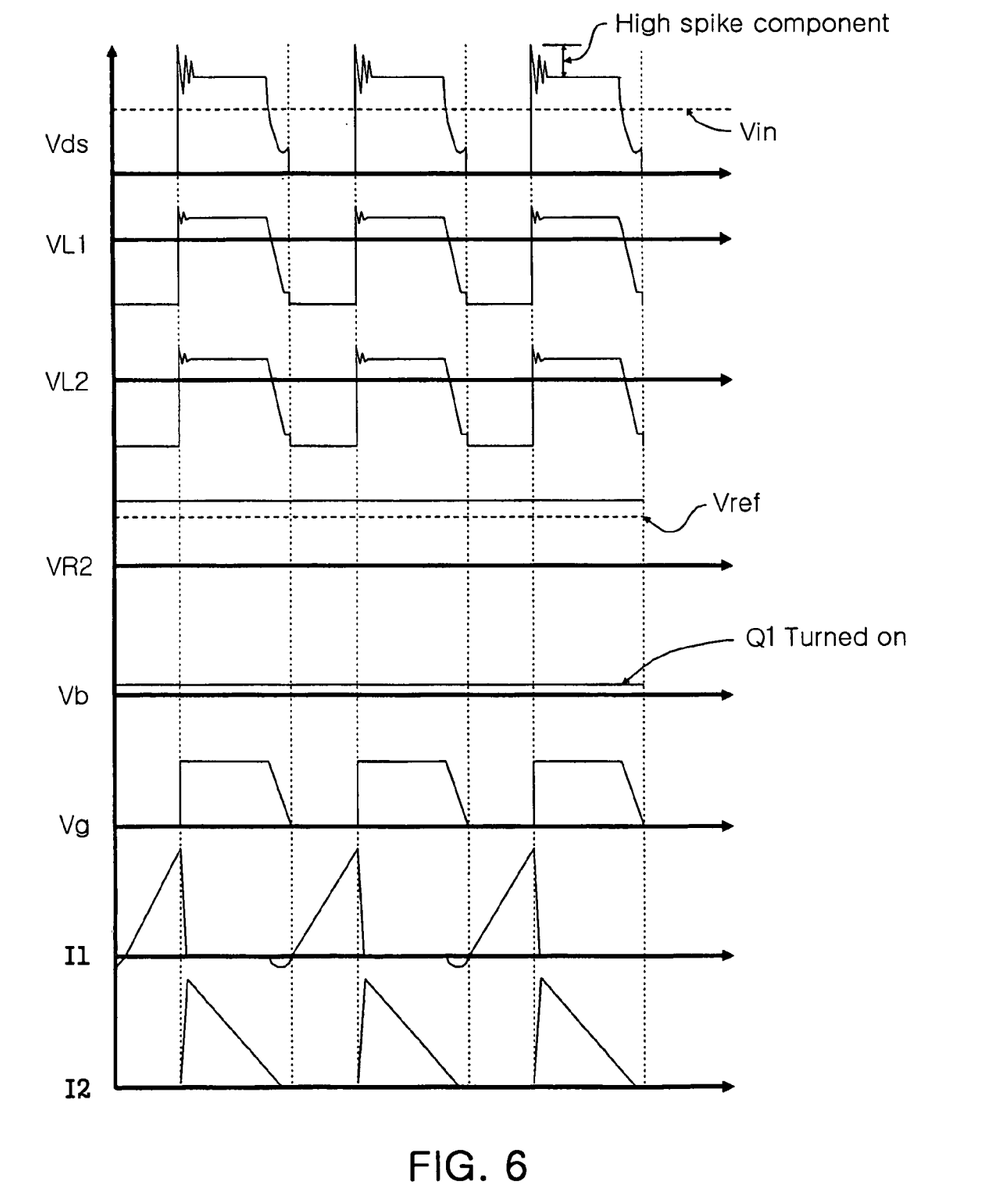
FIG. 6 is a timing chart of main signals of the present invention in a normal load state.
Figure 7:
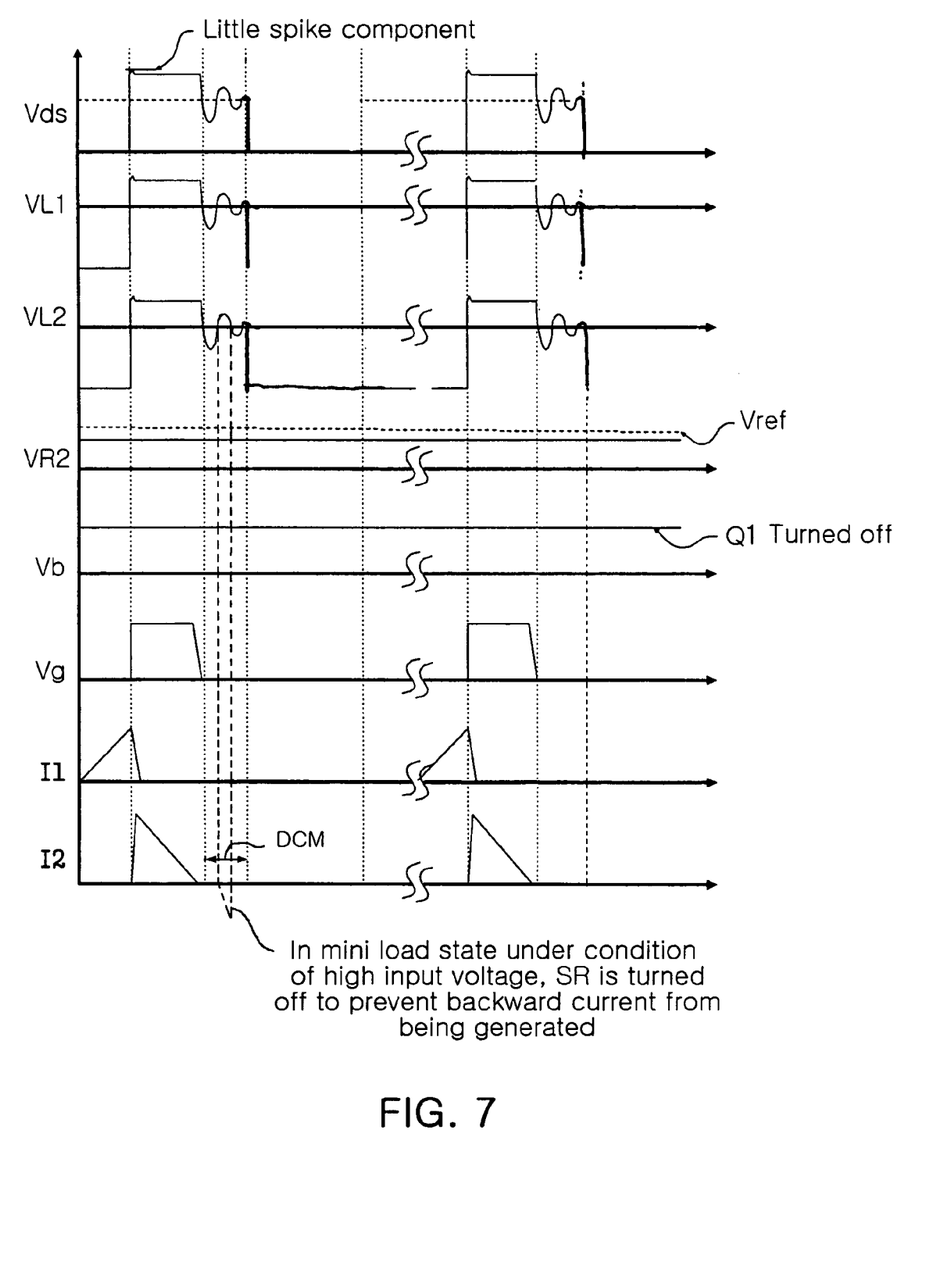
FIG. 7 is a timing chart of the main signals of the present invention in a mini load state.

FIG. 6 is a timing chart of main signals of the present invention in the normal load state and FIG. 7 is a timing chart of the main signals of the present invention in the mini load state.

In FIGS. 6 and 7, Vds is a voltage across the main switch MSW of the flyback transformer 100, VL1 is a voltage induced in the drive secondary winding L21, VL2 is a voltage induced in the detection secondary winding L22, VR2 is a voltage across the resistor R2 under the condition that the voltage Vd detected by the voltage detector 200 is divided by the resistors R1 and R2, Vb is a voltage to the base of the switching transistor Q2 of the first switch SW1, Vg is a voltage to the gate of the MOS transistor of the synchronous rectifier SR, I1 is primary current of the flyback transformer 100, and I2 is secondary current of the flyback transformer 100.

Figure 8:
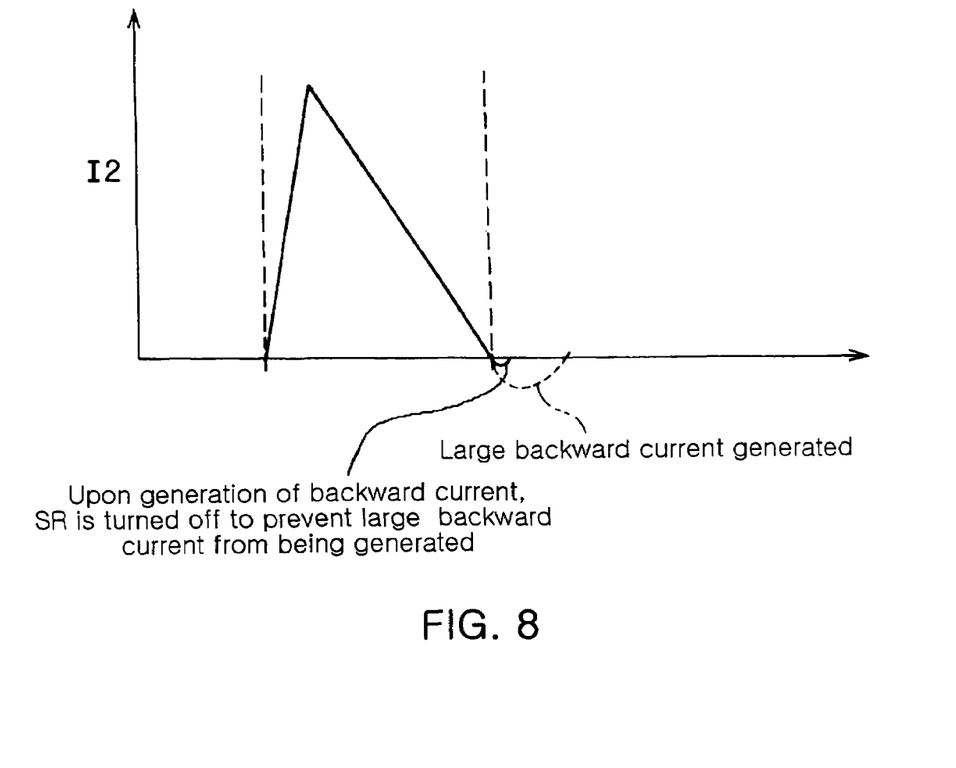
FIG. 8 is a graph illustrating characteristics of secondary current and backward current of the present invention.

FIG. 8 is a graph illustrating characteristics of secondary current and backward current of the present invention. In this drawing, the backward current is indicated by a dotted line in the characteristic graph of I2. From this drawing, it can be seen that the generation of the backward current is initially prevented according to the present invention.

Next, a description will be given of a variable-frequency flyback converter according to a second embodiment of the present invention with reference to FIG. 9.

Figure 9:
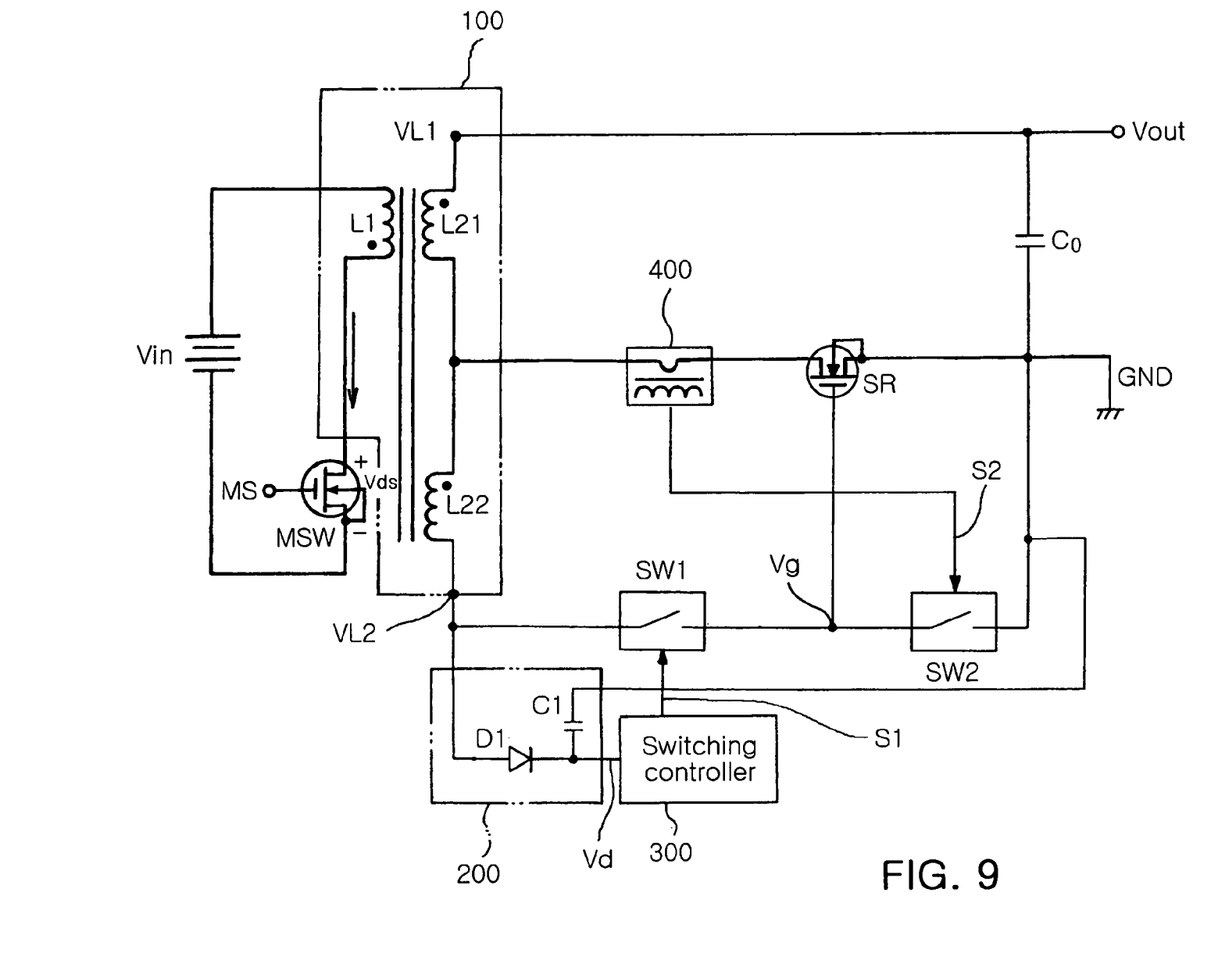
FIG. 9 is a circuit diagram of a variable-frequency flyback converter according to a second embodiment of the present invention.

FIG. 9 is a circuit diagram of the flyback converter according to the second embodiment of the present invention.

As shown in FIG. 9, the flyback converter according to the second embodiment of the present invention comprises a flyback transformer 100, a voltage detector 200, a switching controller 300, a first switch SW1, a synchronous rectifier SR, a current detector 400 and a second switch SW2.

The second embodiment of FIG. 9 is the same in configuration as the first embodiment of FIG. 2, with the exception that the connection positions of a drive secondary winding L21 and detection secondary winding L22 are different from those in the first embodiment and the installation positions of the synchronous rectifier SR and current detector 400 are different from those in the first embodiment.

In the flyback transformer 100, the drive secondary winding L21 has its one end connected to a ground terminal GND and its other end connected to a voltage output terminal and acts to provide a first induced voltage VL1 induced from an input voltage Vin in a first turn ratio with a primary winding L1 of the transformer 100. The detection secondary winding L22 has its one end connected to the voltage detector 200 and its other end connected to the one end of the drive secondary winding L21 and acts to provide a second induced voltage VL2 induced from the input voltage Vin in a second turn ratio with the primary winding L1.

The voltage detector 200 acts to detect the second induced voltage VL2.

The switching controller 300 acts to determine, on the basis of the level of the voltage detected by the voltage detector 200, whether the current load state is a mini load state with a predetermined load or less and output a first switching signal S1 according to a result of the determination. Here, in a normal load state, the switching controller 300 outputs the first switching signal S1 to the first switch SW1 to turn it on. However, in the mini load state, the switching controller 300 outputs the first switching signal S1 to the first switch SW1 to turn it off.

The switching controller 300 of the second embodiment can be implemented in the same manner as that of the first embodiment shown in FIG. 3.

The first switch SW1 acts to switch the supply of the second induced voltage VL2 in response to the second induced voltage VL2 and the first switching signal S1 from the switching controller 300.

The synchronous rectifier SR acts to perform a switching operation depending on the state of the first switch SW1. To this end, the synchronous rectifier SR is provided with a MOS transistor having its source and drain connected to a ground line connected to the drive secondary winding L21 and its gate connected to the first switch SW1.

The current detector 400 acts to detect backward current flowing between the drive secondary winding L21 and the synchronous rectifier SR and output a second switching signal S2 according to a result of the detection.

The second switch SW2 is connected between the ground line connected to the drive secondary winding L21 and the gate of the synchronous rectifier SR and is turned on/off in response to the second switching signal S2 from the current detector 400.

Next, the function and effect of the present invention will be described in detail in conjunction with the annexed drawings.

The operation of the flyback converter according to the first embodiment of the present invention will first be described with reference to FIGS. 2 to 8.

First, a description will be given of the common operation of the flyback transformer 100 of the flyback converter according to the first embodiment of the present invention in the normal load state and the mini load state.

With reference to FIGS. 2 and 3, in the flyback transformer 100 of the flyback converter according to the first embodiment of the present invention, the first induced voltage VL1 is induced in the drive secondary winding L21 from the input voltage Vin in the first turn ratio between the primary winding L1 and the drive secondary winding L21. Also, the second induced voltage VL2 is induced in the detection secondary winding L22 from the input voltage Vin in the second turn ratio between the primary winding L1 and the detection secondary winding L22.

Namely, in the flyback transformer 100, the input voltage Vin is induced from the primary winding L1 to each of the drive secondary winding L21 and detection secondary winding L22 according to a switching operation of the main switch MSW responsive to a main switching signal MS.

Thereafter, the voltage detector 200 detects the second induced voltage VL2 by rectifying it through the rectifying diode D1 and smoothing the rectified voltage through the smoothing capacitor C1.

The switching controller 300 determines, on the basis of the level of the voltage detected by the voltage detector 200, whether the current load state is the mini load state with the predetermined load or less and outputs the first switching signal S1 according to a result of the determination.

For example, in the case where the output load is normal under the condition that the input voltage is high, the switching controller 300 sequentially turns on the first switch SW1 and the synchronous rectifier SR to provide the first induced voltage VL1 induced in the drive secondary winding L21 normally as an output voltage Vout. On the contrary, in the case where the output load is minimal under the condition that the input voltage is high, the switching controller 300 sequentially turns off the first switch SW1 and the synchronous rectifier SR to prevent backward current from being generated.

The voltage Vd detected by the voltage detector 200 is divided by the resistors R1 and R2 shown in FIG. 3 and the voltage VR2 across the resistor R2 is inputted to the shunt regulator RT of the switching controller 300.

Meanwhile, the determination as to whether the current load state is the normal load state or mini load state is made as will hereinafter be described with reference to FIGS. 6 and 7.

In the normal load state, a high spike component is generated in the voltage Vds across the main switch MSW of the flyback transformer 100 at the moment that the main switch MSW is turned off. However, in the mini load state, little spike component is generated in the voltage Vds across the main switch MSW of the flyback transformer 100 at the moment that the main switch MSW is turned off.

Spike components of similar amplitudes to that of the spike component in the voltage Vds are present in the first and second induced voltages VL1 and VL2, too. As a result, the voltage detected by the voltage detector 200 is different in level in the normal load state and the mini load state depending on the amplitude of such a spike component. That is, the voltage VR2 across the resistor R2 is higher than or equal to the reference voltage Vref in the normal load state, as shown in FIG. 6, and is lower than the reference voltage Vref in the mini load state, as shown in FIG. 7.

Therefore, the determination as to whether the current load state is the normal load state or mini load state can be made on the basis of the level of the voltage detected by the voltage detector 200.

Then, with reference to FIG. 4, in the normal load state where the input voltage VR2 is higher than or equal to the reference voltage Vref, the comparator CP of the shunt regulator RT compares the input voltage VR2 with the reference voltage Vref and turns on the transistor Q of the shunt regulator RT as a result of the comparison. As the transistor Q of the shunt regulator RT is turned on, the transistor Q1 is turned on, too, as shown in FIG. 6.

On the contrary, in the mini load state where the input voltage VR2 is lower than the reference voltage Vref, the comparator CP of the shunt regulator RT turns off the transistor Q of the shunt regulator RT and, in turn, the transistor Q1, as shown in FIG. 7. If the transistor Q1 is turned off, the synchronous rectifier SR is turned off, thereby causing the output voltage Vout to be rectified by a body diode of the synchronous rectifier SR.

With reference to FIG. 5, in the operation of the switching controller 300 based on the shunt regulator RT, the input voltage VR2 is higher than or equal to the reference voltage Vref and the N-type transistor Q1 is thus turned on, in the normal load state, and the input voltage VR2 is lower than the reference voltage Vref and the N-type transistor Q1 is thus turned off, in the mini load state.

Next, a description will be given of the respective operations of the flyback converter according to the first embodiment of the present invention in the normal load state and the mini load state.

The flyback converter according to the first embodiment of the present invention is operated in the normal load state, as will hereinafter be described with reference to FIGS. 2, 3 and 6.

With reference to FIGS. 2, 3 and 6, in the normal load state, the first switch SW1 and the synchronous rectifier SR are sequentially turned on to provide the first induced voltage VL1 induced in the drive secondary winding L21 as the output voltage Vout. That is, in the normal load state, the first switch SW1 shown in FIG. 2 is turned on in response to the second induced voltage VL2 and the first switching signal S1 from the switching controller 300 to provide the second induced voltage VL2.

Describing the above operation in more detail with reference to FIG. 3, if the current load state is the normal load state under the condition that the second induced voltage VL2 is applied to the base of the N-type transistor Q2 of the first switch SW1 through the resistor R5, the transistor Q1 of the switching controller 300 is turned on, as stated above, thereby causing the base of the transistor Q2 of the first switch SW1 to become low in level. As a result, the first switch SW1 is turned on to supply the second induced voltage VL2 to the gate of the synchronous rectifier SR. Consequently, the synchronous rectifier SR is turned on to provide the first induced voltage VL1 as the output voltage Vout.

On the other hand, the flyback converter according to the first embodiment of the present invention is operated in the mini load state, as will hereinafter be described with reference to FIGS. 2, 3 and 7.

In the variable-frequency flyback converter of the present invention, a discontinuous conducting mode (DCM) period in which no primary current and secondary current flow exists in the mini load state as stated previously. In the DCM period, as shown in FIG. 7, a valley is generated due to a resonance by parasitic capacitors of the primary winding L1 and main switch MSW of the flyback transformer 100 after the voltage across the main switch MSW is transferred to the secondary windings of the flyback transformer 100.

This valley includes a high voltage causing backward current. That is, the high voltage of the valley undesirably turns on the first switch SW1 and the synchronous rectifier SR in order, thereby causing the backward current to flow. In order to prevent this backward current, it is necessary to compulsorily turn off the synchronous rectifier SR in the mini load state, as will hereinafter be described.

In other words, in the mini load state, a DCM period in which no primary current I1 and secondary current I2 flow at the same time exists as shown in FIG. 7, because an upper-limit switching frequency value is set. In this DCM period, a valley whose voltage level abruptly varies repeatedly for a short time is undesirably generated due to a resonance by the parasitic capacitors of the primary winding L1 and main switch MSW of the flyback transformer 100.

Where the high voltage of this valley is applied to the gate of the synchronous rectifier SR through the first switch SW1 so as to turn on the synchronous rectifier SR, undesired backward current is generated. In this case, it is necessary to compulsorily turn off the synchronous rectifier SR. In the minim load state, it is possible to fundamentally prevent the generation of backward current by compulsorily turning off the first switch SW1 and the synchronous rectifier SR.

That is, the first switch SW1 shown in FIG. 2 is turned off in response to the second induced voltage VL2 and the first switching signal S1 from the switching controller 300 and the synchronous rectifier SR is in turn turned off, so that backward current is blocked. At this time, the first induced voltage VL1 is rectified through a parasitic diode of the synchronous rectifier SR and then provided as the output voltage Vout.

Describing the above operation in more detail with reference to FIG. 3, in the mini load state, as stated previously, the transistor Q1 of the switching controller 300 is turned off under the condition that the second induced voltage VL2 is applied to the base of the transistor Q2 of the first switch SW1 through the resistor R5, thereby causing the base of the transistor Q2 of the first switch SW1 to go high in level. As a result, the first switch SW1 is turned off in order not to pass the second induced voltage VL2 therethrough, so the synchronous rectifier SR is turned off to block backward current. In this case, the first induced voltage VL1 is rectified through the parasitic diode of the synchronous rectifier SR and then provided as the output voltage Vout.

On the other hand, the variable-frequency flyback converter of the present invention detects zero-crossings of the secondary current of the flyback transformer and controls switching timing of the main switch connected to the primary winding of the transformer in accordance with a result of the detection. In this case, since the synchronous rectifier has a low response speed, backward current may be generated as indicated by a dotted line in FIG. 8.

At this time, the current detector 400 detects backward current flowing between the drive secondary winding L21 and the synchronous rectifier SR and then outputs the second switching signal S2 to the second switch SW2. As a result, upon generation of backward current, the second switch SW2 is turned on to rapidly turn off the synchronous rectifier SR by force, thereby preventing the generation of the backward current.

In other words, according to the present invention, the current detector 400 and the second switch SW2 are operated to cut off the generation of backward current at the initial stage of the backward current generation.

The operation of the flyback converter according to the second embodiment of the present invention, configured as shown in FIG. 9, is substantially the same as that of the flyback converter according to the first embodiment of the present invention, as described above, and a detailed description thereof will thus be omitted.

As described above, according to the present invention, it is possible to prevent backward current from being generated in the mini load state, and to cut off the generation of secondary backward current by raising the response speed of the synchronous rectifier.

As apparent from the above description, the present invention provides a variable-frequency flyback converter with a synchronous rectification function for a power supply device, such as a switching mode power supply (SMPS), which is capable of detecting a secondary voltage of a transformer to determine whether the current load state is a mini load state with a predetermined load or less and preventing backward current from being generated in the mini load state, so as to reduce power consumption in the minim load state, including a no-load state.

Further, the generation of backward current can be prevented by virtue of fast zero-crossing switching.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A variable-frequency flyback converter with a synchronous rectification function, comprising:
   a flyback transformer having a primary winding connected to an input voltage, a secondary winding for drive for providing a first induced voltage induced from said input voltage in a first turn ratio with said primary winding, and a secondary winding for detection for providing a second induced voltage induced from said input voltage in a second turn ratio with said primary winding;
   a voltage detector for detecting said second induced voltage;
   switching control means for determining, on the basis of a level of the voltage detected by said voltage detector, whether a current load state is a mini load state with a predetermined load or less and outputting a first switching signal according to a result of the determination;
   a first switch for switching the supply of said second induced voltage in response to said second induced voltage and said first switching signal from said switching control means; and
   a synchronous rectifier for performing a switching operation depending on a state of said first switch, said synchronous rectifier having its source and drain connected to any one of a voltage output line or ground line connected to said drive secondary winding and its gate connected to said first switch.

2. The variable-frequency flyback converter as set forth in claim 1, further comprising:
   a current detector for detecting backward current flowing between said drive secondary winding and said synchronous rectifier and outputting a second switching signal according to a result of the detection; and
   a second switch connected between any one of said voltage output line or ground line connected to said drive secondary winding and said gate of said synchronous rectifier, said second switch being turned on/off in response to said second switching signal from said current detector.

3. The variable-frequency flyback converter as set forth in claim 2, wherein:
   said synchronous rectifier is connected to said voltage output line connected to said drive secondary winding; and
   said second switch is connected between said voltage output line connected to said drive secondary winding and said gate of said synchronous rectifier to turn on/off said synchronous rectifier in response to said second switching signal from said current detector.

4. The variable-frequency flyback converter as set forth in claim 3, wherein said switching control means is adapted to determine, on the basis of the level of the voltage detected by said voltage detector, whether the current load state is said mini load state and, upon determining that the current load state is said mini load state, output said first switching signal to said first switch to turn it off.

5. The variable-frequency flyback converter as set forth in claim 4, wherein said switching control means includes:
   a shunt regulator for comparing an input voltage resulting from the voltage detected by said voltage detector with a predetermined reference voltage and turning itself off if the resulting input voltage is lower than the reference voltage; and
   a transistor turned off as said shunt regulator is turned off, for turning off said first switch.

6. The variable-frequency flyback converter as set forth in claim 2, wherein:
   said synchronous rectifier is connected to said ground line connected to said drive secondary winding; and
   said second switch is connected between said ground line connected to said drive secondary winding and said gate of said synchronous rectifier to turn on/off said synchronous rectifier in response to said second switching signal from said current detector.

7. The variable-frequency flyback converter as set forth in claim 6, wherein said switching control means is adapted to determine, on the basis of the level of the voltage detected by said voltage detector, whether the current load state is said mini load state and, upon determining that the current load state is said mini load state, output said first switching signal to said first switch to turn it off.

8. The variable-frequency flyback converter as set forth in claim 7, wherein said switching control means includes:
   a shunt regulator for comparing an input voltage resulting from the voltage detected by said voltage detector with a predetermined reference voltage and turning itself off if the resulting input voltage is lower than the reference voltage; and
   a transistor turned off as said shunt regulator is turned off, for turning off said first switch.

* * * * *